Figure 1:
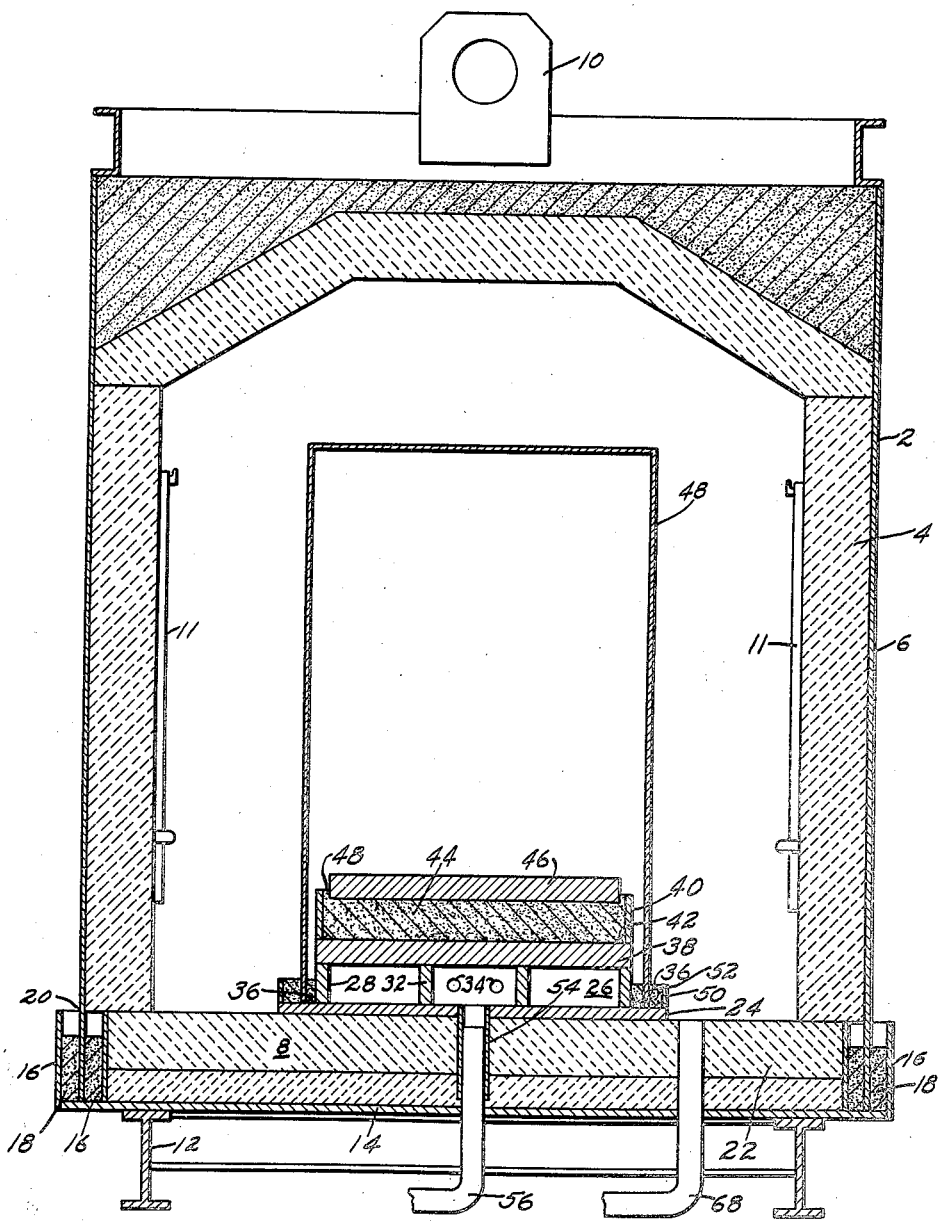

Feb. 6, 1940.    J. H. BRAMBLE    2,189,624
HEAT INSULATING HEARTH
Filed March 4, 1939    4 Sheets-Sheet 1

WITNESSES:
Leon M. Garman
Bernard L. Zangwill

INVENTOR
John H. Bramble.
BY O. B. Buchanan
ATTORNEY

Feb. 6, 1940.  J. H. BRAMBLE  2,189,624
HEAT INSULATING HEARTH
Filed March 4, 1939  4 Sheets-Sheet 2

WITNESSES:

INVENTOR
John H. Bramble.
BY
ATTORNEY

Feb. 6, 1940.   J. H. BRAMBLE   2,189,624
HEAT INSULATING HEARTH
Filed March 4, 1939   4 Sheets-Sheet 3

WITNESSES:
Leon M. Garman
Bernard L. Zangwill.

INVENTOR
John H. Bramble.
BY O. B. Buchanan
ATTORNEY

Feb. 6, 1940.   J. H. BRAMBLE   2,189,624
HEAT INSULATING HEARTH
Filed March 4, 1939   4 Sheets—Sheet 4
Fig. 6.
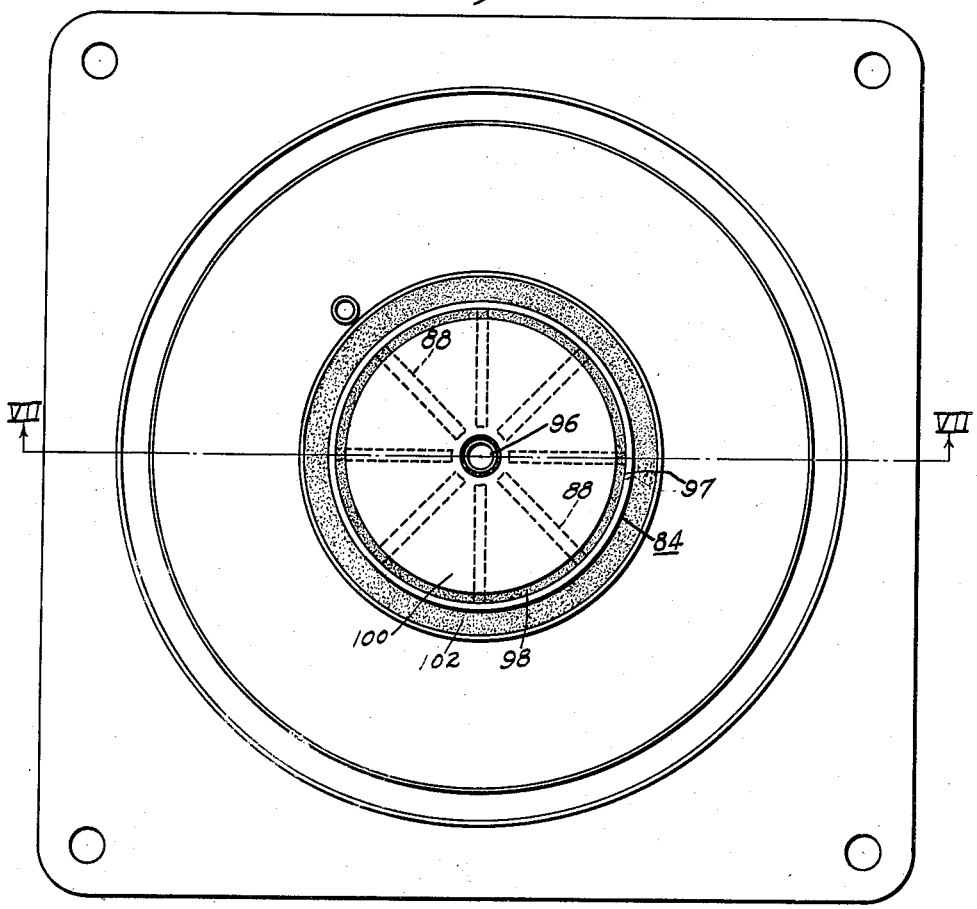
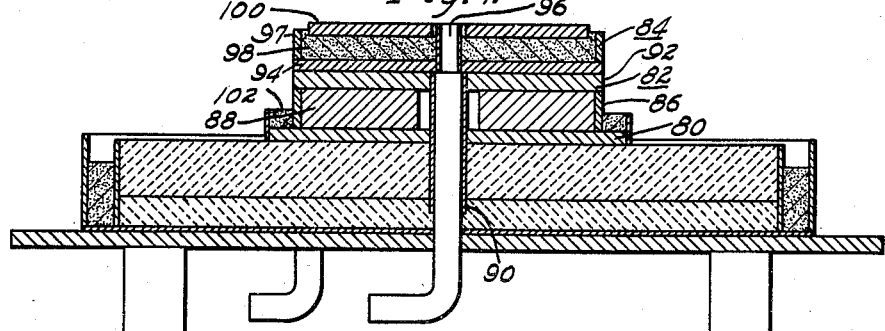
WITNESSES:
INVENTOR
John H. Bramble.
BY
ATTORNEY Patented Feb. 6, 1940

2,189,624

UNITED STATES PATENT OFFICE 2,189,624

HEAT INSULATING HEARTH

John H. Bramble, Farrell, Pa., assignor to Westinghouse Electric & Manufacturing Company, East Pittsburgh, Pa., a corporation of Pennsylvania Application March 4, 1939, Serial No. 259,861

13 Claims. (Cl. 263—42)

This invention relates to a charge-supporting hearth for a heat-treating furnace preferably of the type operated at fairly high temperatures and having a protective gaseous atmosphere therein for enveloping the charge during the heat treatment thereof.

It is an object of my invention to provide a hearth which will have a long life through repeated heat runs; which can be constructed inexpensively of ordinary steels; and which will be sturdy and firm, and capable of supporting heavy loads.

It is a further object of my invention to provide a hearth for a heat-treating furnace which may be continuously employed for repeated heat runs in spite of distortion and growth of the parts thereof that in prior constructions necessitated frequent repair of the hearth, and even replacement after a relatively short number of heat runs.

It is a further object of my invention to provide a hearth for a heat-treating furnace so constructed that it will have relatively high thermal resistance to the conduction of heat from the charge.

It is a further object of my invention to provide a hearth for a heat-treating furnace so constructed that its surface may be maintained flat in spite of distortion and growth of the parts thereof.

It is a primary object of my invention to provide a hearth for a heat-treating furnace so constructed that the distortion and growth of certain of its parts can be tolerated while those parts where distortion and growth may have detrimental effects can be readily straightened or replaced at a small expense.

My invention can be embodied in a hearth of any desired shape, and in this application I have disclosed a rectangular hearth and a circular one, each of which comprises a base plate upon which rests a strong spacer framework. Resting upon the framework is a container comprising a bed plate and an annular, upstanding member forming the sides of the container. The container is adapted to hold a bed of a divided refractory sand, such as, for example, alumina, zircon sand or magnesia, which serves to insulate the lower framework and base plate from the heated charge which is adapted to be placed upon a rather heavy charge-supporting plate, in turn, resting loosely on the sand bed. In view of the construction of my hearth, I am able to make all of the elements of relatively inexpensive steel such as boiler plate, and although any or all of the aforesaid parts may warp or otherwise lose their original shape with repeated heat runs, the charge-supporting plate can always be straightened and the sand bed leveled so that the charge-supporting surface of the hearth is always flat in spite of any distortion or growth of its other parts.

In accordance with my invention, the side member forming the sides of the container may be welded to the bottom plate or, in the alternative, may rest loosely thereon. The latter construction has the advantage that, with the side member loose on the bottom plate, I can readily change, if necessary, the height of the hearth to some extent by the use of side members of different height or by eliminating the annular member and sand bed, and resting the charge-supporting plate directly on the bottom plate of what previously was the container.

This structure with the loose side member has an added advantage in that no stresses occur between the bottom and sides of the container with expansion and contraction of the parts, nor does the distortion of one affect the other.

In one modification of my invention the incoming protective gases can be discharged inside the framework which is provided with suitable discharge or outlet openings for the gas to pass into the interior of the heating chamber. In such case, the inlet and outlet are so disposed that the gas will be somewhat pre-heated in passing through the framework.

In another embodiment of my invention, the incoming gas can be directly passed upwardly to the heating chamber of the furnace through pipes passing through the base plate, the framework, the container, and the charge-supporting plate; and it is, accordingly, obvious that I can adapt my hearth to different forms or constructions by which the protective gaseous atmosphere is conveyed from the outside of the furnace to the heating chamber within it.

Figure 2:
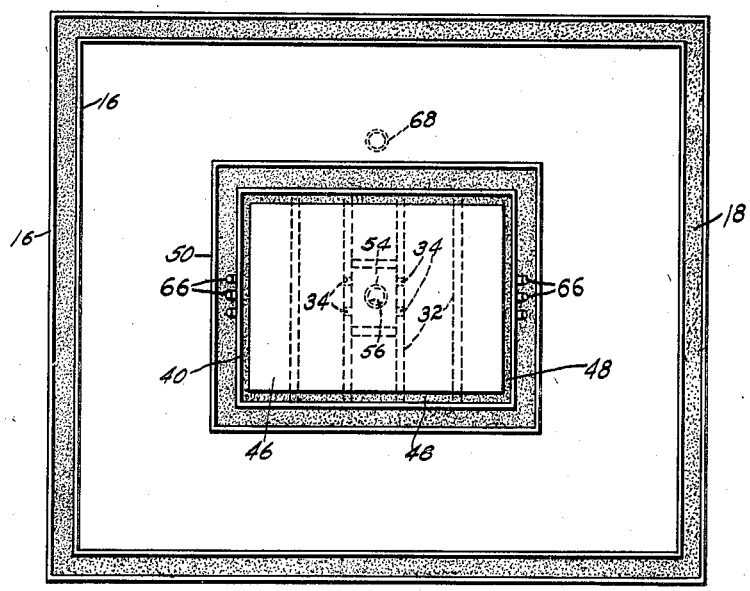
Figure 3:
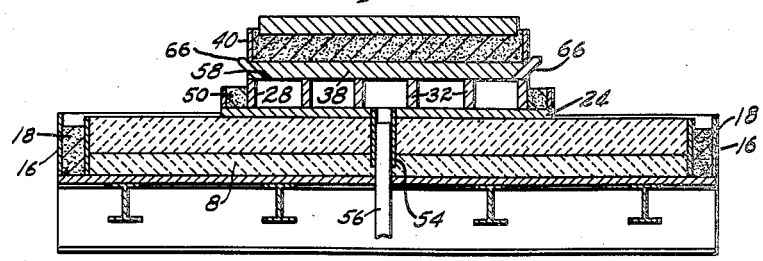
Figure 4:
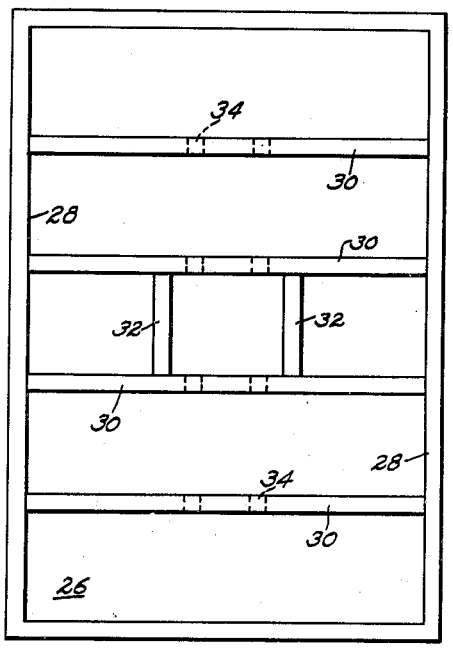
Figure 5:
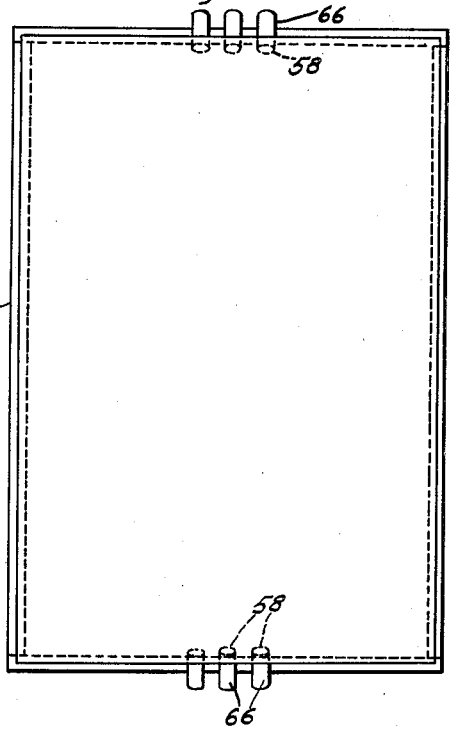
Figure 8:
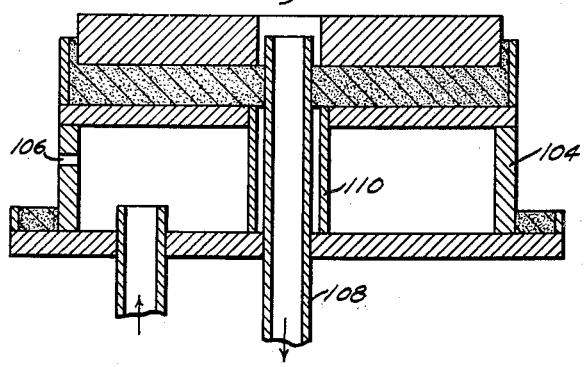

The features briefly and generally described in the foregoing are some of the innovations of my invention and other innovations, as well as other objects, features and combinations will be apparent from the following detailed description, taken in conjunction with the drawings, in which:

Figure 1 is a vertical cross-sectional view on an enlarged scale of one embodiment of a furnace in accordance with my invention, and showing certain furnace parts generally and a hearth more particularly, Fig. 2 is a top plan view of the hearth base, Fig. 3 is a vertical cross-sectional view of the hearth base, at right angles to Fig. 1, Fig. 4 is a top plan view on an enlarged scale of the spacer frame employed in the hearth of Fig. 1, Fig. 5 is a top plan view on an enlarged scale of the side member and bed plate forming the container for the hearth of Fig. 1, Fig. 6 is a top plan view of a modified form of hearth, Fig. 7 is a vertical cross sectional view of the modified hearth resting on a furnace base, taken on the line 7—7 of Fig. 6, and Fig. 8 is a cross-sectional view of still another modification of a hearth.

The hearths of my invention are especially useful with furnaces of the so-called bell type which comprises a stationary base and a removable insulated cover or bell therefor. Referring more particularly to Fig. 1, the bell 2 comprises a refractory inner lining 4 and outer metallic casing or shell 6 in accordance with customary structure, the bell being adapted to be raised from and lowered upon a base indicated in its entirety by the reference numeral 8, when a lifting force is applied to a suitable eye bolt 10 or equivalent device. Any suitable means, such as electric heaters 11, may be employed to heat the furnace.

The base of the furnace is supported upon a suitable structural framework 12, and comprises a rather heavy outer metallic casing bottom 14 to which are secured near the periphery thereof spaced upstanding members 16 to confine a suitable sealing material or substance 18 into which a lower flange 20 of the shell 6 at the bottom of the bell extends so that the interior of the furnace is substantially gas-tight. Suitable layers of refractory brick 22 on the casing plate 14 complete the base of the furnace upon which may rest a hearth of my invention.

In the embodiment shown in Figs. 1 through 6, the hearth comprises a rectangular base plate 24 adapted to rest substantially centrally on the base 8 of the furnace. On the top of this base plate 24 is an open framework indicated in its entirety by the reference character 26 and shown more particularly in Fig. 4. This framework comprises an outer, rectangular, wall portion 28 of somewhat smaller dimensions than the dimensions of the base plate 24. Extending from side to side within the framework are a plurality of parallel bracing members 30 in spaced relation along the length of the interior of the framework. If desired, cross ties 32 may interconnect the central bracing members and as many of these cross ties may be employed as may be desired. The elements of the framework are preferably of the same height and, in this particular embodiment, each of the bracing members 30 is provided with a plurality of holes 34 to provide passages within the framework for the flow of protective gases that may be employed. In my preferred construction all the parts of the framework are securely welded together and the framework itself is welded to the base plate 24 as indicated at 36.

Across the top of the framework is a solid bed plate or top plate 38 which may rest loosely on, or may be welded to the framework. The plate 38 forms the bottom of a container whose sides comprise the rectangular frame-like side member 40 standing edgewise on the bed plate 38 and in this particular embodiment welded thereto as at 42. The bed plate 38 and the side member 40, together comprise the container for holding a relatively finely-divided, preferably refractory oxide, insulator 44 forming a bed upon which rests a charge-supporting plate 46. It may be observed that the height of the bed of insulating material 44 is somewhat below the top of the side member 40, and that the charge-supporting plate 46 is of sufficient height to extend above and below the top of the side member. In the use of the hearth, insulating material 44 can be scraped level so that the plate 46 will also assume a horizontal position. In the event that any of the parts of the hearth thus far described warp or grow or otherwise become distorted, it is obvious that I can remove the charge-supporting plate and relevel the insulator bed 44, so that in spite of any misalignment of the other parts of the hearth the charge plate will, nevertheless, be disposed in the desired horizontal position for supporting the charge to be heat treated.

Of course, the charge-supporting plate itself may become distorted for one reason or another during heat runs, but with my construction, the charge plate can be run through rollers so that it will again have flat surfaces and, by providing suitable clearance spaces 48 between the edges of the charge-supporting plate and the inside of side member 40, I can repeatedly use the charge plate with an assurance of a horizontal supporting surface for the charge. Because the charge-supporting plate is only an ordinary piece of steel, it may be replaced at very little expense when it is not desirable nor feasible to straighten a distorted plate.

The particular modification just described has been adapted to heating charges encased in a gas impervious hood 48 within the bell 2, and to this end the base plate 24 has secured at its outer periphery, and in a gas-tight manner, a small tubular member 50 to provide in conjunction with the sides 28 of framework 26, a seal into which the lower end of the hood may be disposed.

To convey gases to the inside of the hood, I prefer to form the refractory bricks 22 with an aperture into which extends a pipe 54 depending from the periphery of a suitably formed aperture in the base plate 24. An intake pipe 56, in turn, extends into the pipe 54 and by welding the parts wherever there is a possibility of air leakage, I assure an uncontaminated flow of protective gaseous atmosphere through the pipe 56 into the framework 26. The holes 34, previously described in the cross members 30, permit the incoming gas to distribute itself through the framework and eventually find an outlet through a plurality of oblique holes 58 drilled into each end of the bed plate 38. I purposely direct the openings 58 upwardly so as to facilitate the flow of the gas upwardly in the hood, and if desired small guide pipes 66 may be welded at the extremity of the openings 58 to further guide the gas upward. An outlet pipe 68 from the interior of the furnace provides an exhaust means for any spent atmosphere within the furnace.

It may be mentioned at this point that the fineness of the refractory sand 44 is not critical. However, the sand should not be so fine that it would tend to bake or cake nor should it be so coarse as to adversely effect its insulating properties. I have found an insulating magnesia sand of 4 to 10 mesh to be especially satisfactory and easy to level, but I desire it to be distinctly understood that I am not limited to this size.

Referring more particularly to the modification shown in Figs. 6 and 7, the features of the hearth are substantially the same as those of Figs. 1 through 4 and comprise a base plate 80, a framework 82, and a container, in effect, 84. However, this hearth is circular in form for adaption, of course, to a circular furnace and moreover differs somewhat in detail in the construction of the framework and container. In this particular instance the framework comprises an outer tubular member 86 having inwardly-projecting, radially-directed braces 88. As shown in Fig. 7, eight such braces 88 are equally spaced inwardly in the ring 86 and terminate somewhat short of the center to provide room for a vertical pipe 90 forming an inlet for the protective gaseous atmosphere. The framework 82 is capped by a cap plate 92, and I prefer to securely weld the base plate 82, the ring 86, the radial braces 88 and the cap plate 92 into a rigid unitary structure with the tube 90 extending downwardly from the top surface of the cap plate 92 which, of course, has a suitable aperture to accommodate such construction.

The cap plate 92 is rather thick so that it itself may comprise a charge-supporting surface, if desired, but in accordance with the prior embodiment, I can rest a container 84 thereon if the charge is to be insulated from the hearth, or if a flat surface for supporting the charge at all times with repeated heat runs is wanted. To this end, I provide a bed plate 94 having an upstanding nipple pipe 96 screwed or otherwise fastened centrally therein and axially aligned with the pipe 90. The bed plate 94 has resting thereon an outer tubular ring 97 but in this case the ring is in no way secured to the bed plate. However, the two elements do form a container for confining the insulating sand bed 98 upon which rests the centrally-apertured charge supporting plate 100 extending, as in the prior embodiment, below and above the top of the ring 97 of the container 84, and suitable clearances are provided, as before, between the edge of the plate 100 and the inside of the ring 97 so that distortion or growth of either will not bind the other. A seal 102 may also be provided which is constructed in the same manner as the previously described seal for the lower edges of the hood 48.

In the embodiment of Figs. 6 and 7 the incoming atmosphere flows centrally of the hearth through the nipple and aperture in the charge-supporting plate, but it is obvious that if desired the nipple 96 may be extended upwardly to any desired height so that the protective atmosphere may be discharged within the hood of the furnace at the desired point of the height of the hood and even at the top thereof.

In Fig. 8 I show a further modification of my hearth in which the protective atmosphere enters the interior of a framework 104 and flows out thereof and into the heating chamber through suitable upwardly directed apertures 106, coming down through the outlet pipe 108 through the center of the hearth. In such case the framework is suitably modified for this type of circulating system and comprises two, nested, vertical members, one forming the exterior of the frame and the other 110 surrounding the pipe 108.

While I have shown my invention in a number of different modifications as an indication of the general utility of the principles of my invention, it is obvious that many other modifications may be readily obtained. Accordingly, I desire that the appended claims be given their broadest interpretation and limited only by the prior art.

I claim as my invention:

1. A hearth for a heat-treating furnace comprising a container having a bottom and sides, a bed of finely divided refractory in said container, and a metallic charge-supporting plate resting on said bed.

2. A hearth for a heat-treating furnace comprising a container having a bottom and sides, a bed of finely-divided refractory in said container, and a metallic charge-supporting plate resting on said bed and somewhat smaller than the upper, inner periphery of said sides.

3. A hearth for a heat-treating furnace comprising a container having a bottom and sides, a bed of a finely-divided refractory in said container, a metallic charge-supporting plate resting on said bed and somewhat smaller than the upper, inner periphery of said sides, the top of said bed, and the thickness of said plate being such that it extends below and above the tops of said sides.

4. A hearth for a heat-treating furnace comprising a base plate, a supporting and spacing framework welded to said base plate, and having outer sides smaller than the periphery of said base plate, an upstanding rim welded to said base plate and forming with said sides a gas-sealing trough, said framework comprising a top-plate whereby the framework is, in effect, enclosed, said base plate having a gas-inlet through which a protective gaseous atmosphere may be admitted to the interior of said framework, the upper part of said framework near the edges thereof having gas-outlet means.

5. A hearth for a heat-treating furnace comprising a base plate, a supporting and spacing framework welded to said base plate, and having outer sides smaller than the periphery of said base plate, an upstanding rim welded to said base plate and forming with said sides a gas-sealing trough, said framework comprising a top-plate whereby the framework is, in effect, enclosed, said base plate having a gas-inlet through which a protective gaseous atmosphere may be admitted to the interior of said framework, the upper part of said framework near the edges thereof having gas-outlet means, said framework including a plurality of reinforcing members comprising apertured, cross-braces between said sides, and said inlet aperture being disposed substantially centrally of said base plate.

6. A hearth for a heat-treating furnace comprising a container having a bottom and sides, the said sides resting loosely on said bottom, and a bed of finely-divided refractory in said container.

7. A hearth for a heat-treating furnace comprising a container having a bottom and sides, the said sides resting loosely on said bottom, a bed of finely-divided refractory in said container, and a flat, metallic charge-supporting plate resting on said bed.

8. A hearth for a heat-treating furnace comprising a container having a bottom and sides, the said sides resting loosely on said bottom, a bed of finely-divided refractory in said container, a flat, metallic charge-supporting plate resting on said bed, and somewhat smaller than the upper, inner periphery of said sides.

9. A hearth for a heat-treating furnace comprising a container having a bottom and sides, the said sides resting loosely on said bottom, a bed of finely-divided refractory in said container, a metallic, charge-supporting plate resting on said bed and somewhat smaller than the upper, inner periphery of said sides, the top of said bed and the thickness of said plate being such that it extends below and above the tops of said sides.

10. A hearth for a heat-treating furnace comprising a base plate, a supporting and spacing framework welded to said base plate, and having outer sides smaller than the periphery of said base plate, an upstanding rim welded to said base plate and forming with said sides a gas-sealing trough, said framework comprsing a top-plate whereby the frame is, in effect, enclosed, said base plate having a gas-inlet through which a protective gaseous atmosphere may be admitted to the interior of said framework, the upper part of said framework near the edges thereof having gas-outlet means, a retainer ring-member on the top-plate near the periphery thereof, forming with said top-plate a container, a finely-divided refractory sand in said container, and a metallic charge-supporting plate resting on said bed, and of a size somewhat smaller than the upper, inner periphery of said ring-member.

11. A hearth for a heat-treating furnace comprising a base plate, a supporting and spacing framework welded to said base plate, and having outer sides smaller than the periphery of said base plate, an upstanding rim welded to said base plate and forming with said sides a gas-sealing trough, said framework comprising a top-plate whereby the frame is, in effect, enclosed, said base plate having a gas-inlet through which a protective gaseous atmosphere may be admitted to the interior of said framework, the upper part of said framework near the edges thereof having gas-outlet means, said framework including a plurality of reinforcing members comprising apertured, cross-braces between said sides, said inlet being disposed substantially centrally of said base plate, a retainer ring-member on the top-plate near the periphery thereof, forming with said top-plate a container, a finely-divided refractory in said container, and a metallic charge-supporting plate resting on said bed, and of a size somewhat smaller than the upper, inner periphery of said ring-member.

12. A heat-treating furnace comprising a bottom wall having an exterior metallic casing and an inner layer of refractory brick, both having aligned apertures, a base plate resting on said refractory brick, a framework on said base plate, and a container having a bottom and sides on said framework, each of the last three elements having openings aligned with said apertures, a pipe extending downwardly from the top of said framework and through said openings in said framework and base, and through the said aperture in said refractory brick, an upwardly-extending nipple pipe secured to the said bottom at the periphery of the said opening therein, said nipple being approximately the height of said sides, a divided non-metallic refractory bed in said container, and an apertured charge-supporting plate resting on said bed with the said nipple extending into the last said aperture.

13. A hearth for a heat-treating furnace comprising a base plate, a container, a spacing and supporting structure on said base plate and supporting said container, said container having bottom and sides for confining a finely-divided refractory therein, and a charge-supporting plate resting on said refractory.

JOHN H. BRAMBLE.